April 16, 1963 P. G. CATH ET AL 3,086,081

TELEPHONE PAY STATION

Filed April 9, 1959

INVENTORS P. G. CATH
L.O. HILL

BY John E. Cassidy

ATTORNEY

United States Patent Office 3,086,081

Patented Apr. 16, 1963

3,086,081
TELEPHONE PAY STATION

Pieter G. Cath, Ann Arbor, Mich., and Lester O. Hill, San Antonio, Tex., assignors to Bell Telephone Laboratories, Incorporated, New York, N.Y., a corporation of New York Filed Apr. 9, 1959, Ser. No. 805,257
6 Claims. (Cl. 179—6.3)

This invention relates to telephone pay stations and particularly to telephone pay stations requiring the deposit of a predetermined amount of money before permitting completion of a connection to a called party.

Because the revenue from telephone pay stations is directly dependent upon the coin collecting circuitry it is essential that all operations concerning the disposal of deposited coins be performed in as reliable and accurate a manner as possible. These operations include: enablement of the associated telephone set only upon deposit of the minimum amount required to establish a call; appraisal by the central office of the amount deposited; and disposal of the coins deposited in accordance with particular requirements. At least three factors must be considered when adapting a piece of equipment to facilitate these operations, namely, the cost involved, the electrical or mechanical reliability of the equipment, and the susceptibility of the equipment to fraudulent usage.

An object of the present invention is the provision of a coin collector circuit which may be conveniently and economically adjusted to furnish varying initial rate controls as economic conditions demand.

Another object of this invention is the provision of a coin disposal mechanism reliably operable from a central office, this reliability being constant even though the loops between the central office and remote pay station are of differing lengths.

Considering another aspect of telephone pay stations, it has been found advantageous to separate the basic telephone equipment from the coin disposal equipment. Such separation requires connecting the two equipments by a set of conductors. These conductors frequently are exposed and therefore are accessible to pay station users. For this reason they should not be susceptible to tampering to afford charge-free calls.

A further object of the present invention is the provision of a telephone pay station which may be physically divided into telephone and coin disposal equipment groups, such groups being connected by a minimum number of tamperproof conductors.

The embodiment chosen to illustrate the principles of the present invention utilizes the tip-start form of operation. With this mode of operation the central office is apprised that a remote pay station is seeking service by the detection of a ground on the tip lead. The ground is commonly applied via a pair of hopper trigger contacts that are closed in response to the deposit of a coin. Upon detection of such a ground, the central office applies a potential between the ring and tip conductor, polarized negatively on the ring conductor. This potential provides the energy required for ensuing dialing, transmitting, and receiving operations. Upon completion of the call due to expiration of the allotted time or hangup of either party, the deposit is commonly disposed of by the application of a potential between the tip conductor and ground.

The function of controlling the initial deposit has been handled in a variety of ways when tip-start operation is employed. One such technique is to delay establishing the ground connection until the initial rate has been deposited. A defect in this technique is the possibility that the central office will misinterpret false grounds and automatically apply potential and dial tone, thereby enabling a call to be commenced free of charge. Another defect is the condition that arises when a call is abandoned when an insufficient deposit has been made. In such a case the central office will not have been connected and consequently cannot exercise control over the coin disposal circuitry to refund the deposit. To compensate for this lack of central office control, mechanical refunding means must be provided. Such means have taken the form of push-buttons and switchbook linkages. The former requiring undesirable initiative on the part of telephone users, and the latter obviously defeating the objective of providing separate telephone and coin disposal units.

To alleviate the difficulties experienced with the technique of delaying grounding of the tip conductor, a prior art arrangement has been developed wherein ground is immediately applied but the dialing means is shorted until the required initial amount is deposited. With this arrangement, potential and dial tone are immediately connected although the telephone user must still deposit the initial rate before he can commence his call. Weaknesses in this technique include false dialing due to false breaks in the line and customer confusion due to application of dial tone before dialing may be accomplished. Note too, that the problem of losing central office control in the event a call is terminated before the coins are dispsed of, is still present. This is a natural consequence of the opened loop which follows hangup. Mechanical linkages have been employed to remedy this situation, but not entirely with success.

This invention surmounts the previously encountered difficulties by immediately grounding the tip conductor when a deposit is made, and by coincidently shorting the transmitter, receiver, and dial, the short being removed when a predetermined minimum amount is deposited. In addition, a unique contact arrangement provides a coin control circuit path whenever the coin collector contains an undisposed deposit, thereby providing means through which the central office may exerise control.

A feature of this invention is the provision of means for establishing a closed loop connecting a telephone set and a central office in response to a first deposit, and cooperating means which disables the transmitter, receiver, and dial until after a predetermined initial amount has been deposited.

Another feature of this invention is the provision of unique means for shorting the transmitter, receiver, and dial upon deposit of a first amount and prior to deposit of a predetermined minimum amount, and for subsequently opening said short so that subsequent amounts deposited for overtime charges, when required, may be detected.

A further feature of the present invention is the employment of deposit totalizing and electronic signaling means in conjunction with a unique circuit which may be used in either operator controlled or automatically controlled systems.

Still another feature of the invention is the provision of a unique circuit established upon refund or collection of deposits for resetting the totalizing means.

Another feature relates to the provision of means for controlling deposit disposal following the abandonment of a call.

Fundamentally, the present invention comprises equipment operative in conjunction with the deposit totalizing, signaling, and disposal means, to cause immediate connection to the central office upon deposit of any coin. Following a deposit, shunting means is provided for disabling the transmitter, receiver, and dial until the initial rate is deposited, which shunting means also provides a path for performing coin disposal operations should the call be abandoned before completion. In the event the required initial amount is deposited, means responsive to the potential applied by the central office to the ring and tip conductor causes the aforementioned shorting means to be disabled and causes the deposit registered in the totalizing means to be read out. The talking potential is used to maintain the shorting means disabled during the ensuing call and thereby permits the extension of calls into overtime by the making of additional deposits. In the event that the call is abandoned, the shorting means is disabled by the application of refund potential to the tip conductor, which potential also causes the coins to be refunded and the deposit registered on the totalizing means to be read out.

The foregoing, as well as additional objects and features will be more clearly understood and appreciated from the following description made in conjunction with the drawing, wherein.

Figure 1:
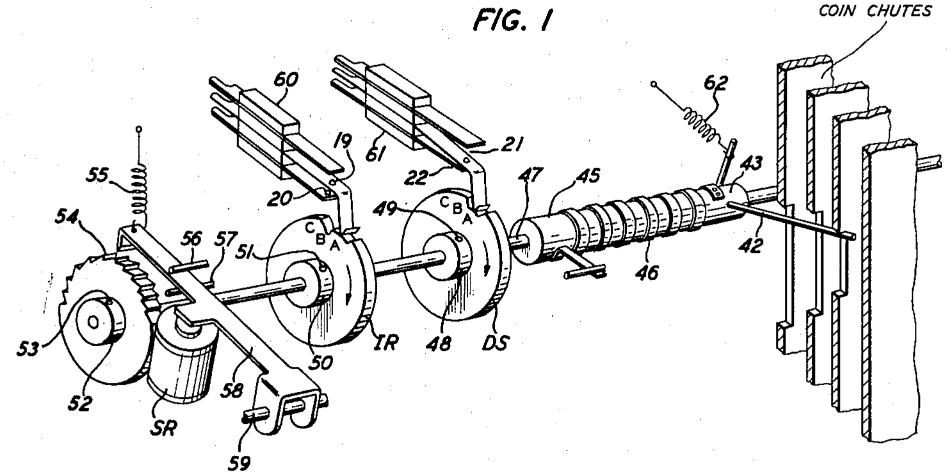
FIG. 1 is a perspective view of a coin totalizing mechanism and associated control devices used in this invention for deposit signaling and initial rate control.

The drawing and the following description disclose a preferred embodiment in which the invention is presently incorporated, although it is to be understood that it may be embodied in other forms which will be suggested hereby to those skilled in the art.

Referring to FIG. 1, a coin totalizer is shown which is similar to that disclosed in the copending application of W. Pferd, Serial No. 518,070, filed June 27, 1955, now Patent No. 2,929,429, issued March 22, 1960. This totalizer has been chosen to illustrate the invention because it provides the functions of registration of each coin as deposited and presentation of the integrated sum in an easily utilized form. In addition, the flexibility inherent in the control means provides the desired convenience and economy as to changes necessitated by varying rate structures. It should be understood, however, that equivalent deposit totalizing means may be employed without departure from the unique concepts present in this invention.

Figure 2:
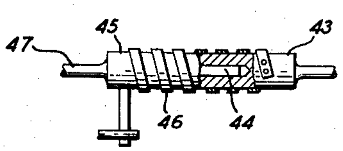
FIG. 2 is a view of the coin totalizer band clutch mechanism which couples the coin finger control shaft and sleeve combination.

The coin totalizer comprises coin finger 42, secured to and projecting from sleeve member 43, which is provided with a coaxial bore into which reduced section 44 of shaft or cylinder 45 fits. This is most clearly illustrated in the cutaway view of FIG. 2. The elements 43 and 45 constitute two cylinders which have a common axis of rotation and which are torsionally coupled by the friction therebetween and by coil spring 46. Cylinder 43, to which coin finger 42 is secured in any suitable manner, may be regarded as the driving cylinder and cylinder 45 may be regarded as the driven cylinder. As driving cylinder 43 is rotated due to the weight of a coin upon coin finger 42, spring 46 is wound up and decreases its diameter. The spring consequently grips both cylinders and exerts more torque than when the direction of rotation is such as to tend to unwind the spring. Thus, when a coin is deposited, cylinders 43 and 45 are rotated together through a degree of arc directly proportional to the denomination of the coin deposited and when cylinder 43 is reset under the influence of spring 62, cylinder 45 remains rotated thereby registering the amount of deposit. For a more complete description of the totalizing unit, reference may be made to the aforementioned W. Pferd patent.

Adjustably mounted on shaft 47 and located to the left of cylinder 45, as viewed in FIG. 1, are contact controlling cams IR and DS. These cams are provided with shoulders 50 and 48, respectively, to accommodate set screws 51 and 49 which permit rotational adjustments of the cams relative to the shaft. Spring pileups 60 and 61 are rigidly located with respect to the controlling cams so that the movable springs thereof are acted upon by the surfaces of the controlling cams as the cams are rotated. Each cam performs a specific function, cam IR controlling the required amount of initial deposit and cam DS controlling the deposit appraisal signaling means.

Three rotational positions are shown at which the coin totalizer, and hence the control cams, may reside after deposit of a particular amount. Position A indicates the original or no-deposit position, position B indicates the position assumed when an amount less than the initial rate is deposited; and position C indicates the position assumed when an amount sufficient to pay the initial charge is deposited. As the coin totalizer and control cams are rotated, the contacting surfaces of the cams act upon their associated spring contacts causing them to either make or break at predetermined amounts of rotation thereby performing control functions in response to the deposits of specific amounts. The effect of these contact condition changes will be discussed hereinafter in conjunction with the operation of the circuit elements in FIG. 3. It may be noted that these cams are pictorially represented in FIG. 3 and that the numerical designations therein are identical with those of FIG. 1.

Figure 3:
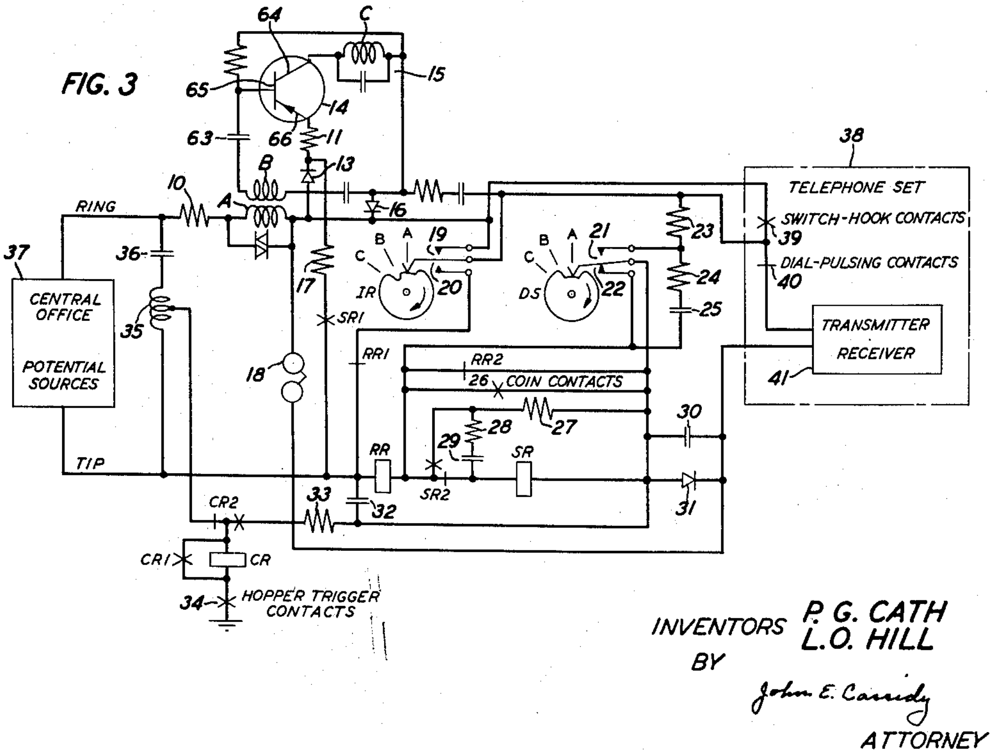
FIG. 3 is a circuit schematic of a telephone pay station employing the illustrative embodiment of the present invention.

The structure on the extreme left end of shaft 47 comprises the reset mechanism. This mechanism is used to reset the totalizing means in a series of steps each of which is proportional to a unit of the deposit. The components utilized consist of stepping relay SR, which is energizable by a D.C. voltage, armature 58, held against stop 56 by spring 55, lower stop 57, whose function will be described later, and toothed wheel 54. The toothed wheel is mounted upon totalizer shaft 47 and consequently rotates clockwise as coins are deposited. When it is desired to reset the totalizer to a no-deposit position, stepping relay SR is energized, rotating armature 58 about pivot 59. The end of armature 58 engages the tooth located immediately below the position in which it is normally poised, thrusting wheel 54 in a counterclockwise direction. The downward motion of armature 58 is limited by stop 57 thereby controlling the degree of rotation imparted to the wheel. In operation, stepping relay SR is used in a well-known electrical circuit which permits it to automatically step as long as power is applied thereto. FIG. 3 discloses several contacts controlled by stepping relay SR which are not pictorially represented in FIG. 1. These contacts are controlled by the relay in any well-known fashion.

Before commencing with a detailed discussion of the operation of the circuit of FIG. 3, a brief explanation of some of the elements thereof will make the following discussion more understandable.

In FIG. 3 the detached contact method of circuit description has been adopted. In this method, as well known, the relay winding is shown physically separated from the contacts controlled thereby. This permits placement of the contacts at locations in the circuit drawing where the functions they perform are visually pertinent, and avoids the necessity of employing a large number of needlessly long connecting lines. With this system of representation, normally closed contacts are represented by a short line perpendicular to the conductor to which they are attached and normally open contacts are represented by a pair of diagonal lines forming an "X" and intersecting the conductor to which they are attached. These contacts are identified by the letters denoting the relay by which they are controlled and an identifying number. An example of the meaning of this symbolism is contacts SR1, located slightly left of the center and half-way down, in FIG. 3. The contacts are illustrated as diagonal lines and therefore denote normally open contacts. When relay SR in the tip conductor is energized, contacts SR1 close and complete the circuit from resistor 17 to the tip conductor. As another example, consider contacts SR2. In this case, two symbols are employed; diagonally crossing lines in one conductor and a short perpendicular line in the other. These symbols denote transfer contacts which are normally open in the line extending between the tip conductor and the junction between resistors 27 and 28 and normally closed in the tip lead between relays RR and SR. Upon operation of relay SR the condition of these contacts will change, closing the circuit between the tip conductor and the junction between resistors 27 and 28, and opening the lead between relays RR and SR.

FIG. 3 includes an oscillator circuit which is based upon transistor 14, telephone set 38, central office 37, and a detailed showing of the elements employed in the coin control circuitry. The oscillator may be interchanged with any suitable equivalent and the operation thereof in relation to pay station identification may be more fully determined from Patent 3,004,105 by Goodale, Jr., et al., issued October 10, 1961.

Considering specifically the coin control circuitry, it will be seen that it comprises cams IR and DS discussed above. These cams act upon contacts 19 and 20, and 21 and 22, respectively. In position A, the no-deposit position, contacts 22 only are closed. In position B, the insufficient deposit position, contacts 20 and 21 are closed and contacts 19 and 22 are open. In position C, the initial deposit position, contacts 19 and 21 are closed and contacts 20 and 22 are open. Three control relays are also depicted, these are: rate relay RR, instrumental in controlling the initial deposit; stepping relay SR, discussed above and instrumental in controlling transmission of tone pulses representative of the amount of deposit; and coin relay CR, operative in response to applied potentials to control the disposition of deposited coins. Coin relay CR may assume any of the well-known direct-current operated forms.

The principles and operating techniques disclosed by this invention may be seen from a consideration of the operations involved in handling a typical call. For purposes of the following discussion it will be assumed that the required initial rate to establish a call from the pay station will be ten cents and that the overtime rate requires a deposit of five cents. This means that the totalizer positions A, B, and C correspond to no deposit, a five cent deposit, and a ten cent deposit, respectively.

To initiate a local call the customer may use either two five cent coins, one ten cent coin, or a larger denomination of coin. In the former case, the first nickel deposited will descend the coin chute, bearing against coin member 42 of the totalizer and in the fashion above described rotate shaft 47 and the members mounted thereon to position "B," indicative of the five cent deposit. Descending further, the five cent coin operates upon well-known hopper-trigger contacts 34 to close them. The closure of hopper-trigger contacts 34 establishes a path therethrough from ground, through coin relay CR, normally closed contacts CR2, and inductance 35 of a well-known balancing network to the tip conductor. The central office is thus apprised of a request for service. In answer to this request, potential and dial tone is placed between the ring and tip conductors so polarized that the ring conductor is negative with respect to the tip conductor. Because a five cent coin only has been deposited, the application of this potential and dial tone is ineffective at the pay station due to the short which exists between the tip and ring conductor through contacts 20, controlled by initial rate cam IR. This shorting path includes resistor 10, transformer winding A, closed switchhook contacts 39 located in subset 38, contacts 20, and normally closed rate relay contacts RR1. Switchhook contacts 39 are normally opened and are mechanically closed upon lifting of the handset. The effect of the shorting is to prevent the pay station user from having any communication with the central office, as he is unable to hear the dial tone, to transmit dial pulses, to transmit audible signals, or signals of any kind.

Upon deposit of a second five cent coin the totalizer moves the controlling cams to position "C," removing the short at contacts 20 and, as hereinafter described, initiating reset of the totalizer followed by enablement of the transmitter and receiver of the telephone set. Coincident with the removal of the short at contacts 20 a new circuit is established at contacts 19 which directly shunts switchhook contacts 39. After reset of the totalizer the customer may manipulate dial pulsing contacts 40 to inform the central office of the call he wishes to establish.

Had the initial deposit been a ten cent coin or a coin of greater denomination, the totalizer would have immediately rotated the controlling cams to positions "C" or beyond. In this case, application of potential and dial tone subsequent to the tip start signal, will result in telephone set enablement as described in the preceding paragraph.

Turning to a consideration of the deposit signaling features of this inventon, it will be noted that contacts 22 conrolled by deposit signaling cam DS are normally closed, placing a direct short across stepping relay SR and its transfer contacts SR2. A five cent deposit opens this short and by closing contacts 21 establishes a path from the ring conductor through resistor 10, transformer winding A, switchhook contacts 39, resistor 23, contacts 21, stepping relay SR, normally closed contacts of transfer contacts SR2, and rate relay RR, to the tip conductor. At this time, relays RR and SR are unable to operate in view of the shunting path created at contacts 20, which has been previously described.

When the initial rate is deposited and the control cams are therefore in position "C," the shorting path at contacts 20 is removed and relays RR and SR operate. Operation of rate relay RR causes normally closed contacts RR1 to open, thereby insuring that during the ensuing call the equipment can no longer be shorted via the path through contacts 20. Energization of stepping relay SR, as previously mentioned, causes the stepping back of the totalizer to its initial "A" position. Electrically, this is achieved in a conventional fashion by the use of stepping relay contacts SR2. These transfer contacts alternately open and close the energizing path of stepping relay SR until the path is permanently opened by deposit signaling cam DS at contacts 21. Circuitry is provided in the form of resistor 27 to insure that the impedance looking toward the telephone set is relatively constant during the intermittent operation of relay SR. To fulfill this purpose transfer contacts SR2 are of the make-before-break variety. It is thus seen that whenever the required initial amount is deposited, relay RR operates to remove the short upon both the deposit signaling equipment and telephone set 38, and relay SR operates to reset the totalizer.

In addition to stepping back the totalizing mechanism, relay SR provides a path which connects a tone to the line as each step is taken. This is effected by normally open contacts SR1. Upon application of negative potential to the ring conductor, the oscillator based upon transistor 14 is energized over a path comprising resistor 10, transformer winding A, diode 16, transformer winding C, collector 64, emitter 66, resistor 11, resistor 17, contacts SR1, and the tip conductor. Thus, as contacts SR1 are opened and closed, tone is applied to the line. Because the number of steps taken by the stepping relay is equal to the number of units present in a deposit, the operator or central office is able to ascertain the amount of deposit by counting the number of tone pulses received.

As in the case of telephone pay stations now in service, at the expiration of a predetermined time coin collect potential is applied between the tip conductor and ground to operate coin relay CR. If a customer desires to continue the call into overtime he deposits an additional coin, again rotating the control cams to position B. Because relay RR is operated, contacts RR1 are open and the resulting closure of contacts 20 is not effective to short the telephone equipment. Closure of contacts 21, however, does temporarily short the telephone set and energize stepping relay SR which operates to reset the totalizer and transmit a signal pulse to the central office indicative of the deposit. The call is then permitted to continue for a fixed overtime period.

Whenever a customer terminates a call, the central office is apprised of this fact by the reopening of switchhook contacts 39, which by breaking the loop causes the initiation of disconnect operations. In the event that this happens before the deposit has been collected, the central office, before disconnection, will apply collect potential between the tip conductor and ground to operate coin relay CR.

An instance may arise where a customer decides to abandon a call before its completion to a second party. If the required initial amount has already been deposited, the totalizer will have been automatically set back to its "no deposit" position and the central office will apply refund battery on the tip conductor in the same fashion it is done today. In the event that a five cent deposit only has been made, however, the control cams will reside in position "B" upon hang-up. In this case, stepping relay SR is energized by the refund potential applied to the tip lead. When such a condition occurs, two paths are available from the tip conductor to ground upon operation of the coin relay, these are: a first path through contacts RR1, contacts 20, resistor 23, contacts 21, resistor 33, closed contacts CR2, operated coin relay CR and closed hopper trigger contacts 34; and a second path through relay RR, contacts RR2 in parallel with normally closed contacts of SR2 and relay SR, resistor 33, closed contacts CR2, operated relay CR, and closed hopper trigger contacts 34. The voltage drop across resistor 23 causes energization of relay RR which causes operation of contacts RR1 opening the first path, and also operation of contacts RR2 which removes the short across SR. When the first path is opened, all of the refund current flows directly through the second path retaining relay RR operated and permitting the operation of relay SR to step the totalizer back to no-deposit position "A."

A special condition is experienced when deposits are made without lifting the handset. In such a situation switchhook 39 remains open. If the deposit is equal to the required initial amount, the central office will recognize a closed loop through contacts 19 and apply potential and dial tone causing the totalizer to be reset to position "B," at which time the loop will be opened at contacts 19. The central office recognizes this new open as a hang-up and gives a refund. The refund current resets the totalizer to the "A" position as described above for abandoned calls.

In the event that a single nickel only is deposited without removing the handset, battery will be placed on the line for loop supervision. However, the loop will then be detected to be open. In such a situation also, the central office will be required to apply refund potential to reset the totalizer and refund the coin.

On the incoming calls, since the totalizer is in its initial position, the transmitter and receiver of the telephone set will be placed directly across the line upon closure of switchhook contacts 39 and conversation can proceed. As described in the aforementioned patent by W. D. Goodale, Jr., et al., lifting of the handset on such a call causes the oscillator circuit to place an identification tone on the line so that the line may be recognized by the operator as a coin line.

Protection against fraudulent use of the telephone facilities by grounding any of the exposed conductors is achieved by the inclusion of diode 31 and capacitor 30. Because, when using tip-start operation, a ground on the tip conductor is sensed by a negative potenital, diode 31 effectively isolates telephone set 38 from the starting circuitry. Thus, the only time current will flow between tip conductor and ground, indicating a request for service, is when the ground correctly appears on the coin collector side of back-biased diode 31. During talking, the potential between the ring and tip conductors forward biases diode 31 and it is therefore a low impedance. Capacitor 30 provides a path for the ringing current in the event telephone set 33 receives a call.

The following auxiliary features are also present in the circuit diagram of the illustrative embodiment to provide a more efficient structure. A well-known balance network comprising capacitor 36 and inductance 35, is instrumental in preventing noise voltages from ground from becoming audible in the telephone receiver. In this illustrative embodiment the balance network is located on the central office side of the rate and stepping relays, RR and SR, in order to permit the proper operating current to flow through these relays at strategic times. Other refinements include the connection of normally closed contacts RR2 and normally open coin contacts 26 across stepping relay SR. The former contacts insure that relay RR operates before relay SR and permits the voltage drop across resistor 23 to appear directly across relay RR in the event that a single nickel only has been deposited on abandoned calls. Coin contacts 26 close when coins move coin arm 42 thus preventing the stepping relay from restoring the totalizer shaft while coins are being deposited. It should be further noted that, in order to cause slow release of coin relay CR, the familiar expedient of placing a short across its windings, when operated, is employed in the form of contacts CR1. Attention is also directed to the surge suppression circuit, comprised of resistor 24 and capacitor 25, across contacts 21 and 22. This combination protects the transfer contacts controlled by cam DS and also protects contacts RR2 and 26. A similar combination comprising resistor 28 and capacitor 29 bridge continuity transfer contacts SR2.

Capacitor 32 is required to provide a low impedance path for voice frequencies around the inductive winding of relay RR. In addition, capacitor 32 provides a low impedance path for electrical noise generated by stepping relay SR. A still further function of this capacitor is the protection of contacts 20 and RR1.

The above description serves merely to illustrate one embodiment of the invention. It is to be understood that changes in the elements thereof within the scope of one skilled in the art may be made without departing from the spirit or scope of the invention.

What is claimed is:

1. A telephone pay station connected by a pair of lines to a central office comprising transmitting and receiving means connected to said lines, totalizing means operable in response to the deposit of coins for registering the amount of deposit, means controlled by said totalizing means operative upon deposit of a first amount to connect a low impedance path between said lines and operative upon deposit of a second amount which taken in conjunction with said first amount equals a predetermined minimum amount to disconnect said low impedance path, and means controlled by said totalizing means operative upon deposit of said first amount to connect relay means in parallel with said low impedance path, said relay means being operative upon deposit of said predetermined minimum amount to open said low impedance path, and relay contact means operative upon opening of said path to prevent said path from reclosing during the remainder of the call.

2. In a coin controlled station connected by a pair of conductors to a control point, totalizing means operable in response to the deposit of coins for registering the amount of deposit, first contact means controlled by said totalizing means to connect a low impedance path between said conductors upon deposit of a first predetermined amount less than a minimum initial amount and to disconnect said low impedance path upon deposit of a second equal predetermined amount, second contact means controlled by said totalizing means to connect a deposit appraisal circuit including a resistance means between said conductors upon deposit of said first predetermined amount, first relay means in said deposit appraisal circuit responsive to a potential condition on said resistance means connected between said conductors after deposit of said second predetermined amount to disable said low impedance path, and second relay means in said deposit appraisal circuit responsive to said potential condition to reset said totalizing means.

3. In a coin controlled station connected by a pair of conductors to a central control point, totalizing means operable in response to the deposit of coins for registering the amount of deposit, first contact means controlled by said totalizing means to connect a low impedance path between said conductors upon deposit of a first predetermined amount and to disconnect said low impedance path upon deposit of a second predetermined amount which when added to said first amount equals a minimum initial amount, second contact means controlled by said totalizing means to connect a deposit appraisal circuit between said conductors upon deposit of said first predetermined amount, relay means in said deposit appraisal circuit responsive to a direct current talking potential condition applied after deposit of said first amount by said central control point on said conductors after deposit of said second predetermined amount to disable said low impedance path, signal control means in said deposit appraisal circuit responsive to said talking potential condition to reset said totalizing means in discrete steps, and an oscillator tone signal source controlled by said signal control means to transmit a signal on said conductors to said central point for each said discrete step taken.

4. In a telephone pay station connected to a central office by two conductors, totalizing means operable in response to the deposit of coins for registering the amount of deposit, first contact means controlled by said totalizing means to connect a shorting path across said conductors upon deposit of a first amount and to disconnect said shorting path upon deposit of a second amount which taken in conjunction with said first amount equals a predetermined minimum amount, second contact means controlled by said totalizing means to connect a deposit appraisal circuit between said conductors upon deposit of said first amount, a transmitter and receiver connected across said second contact means, relay means in said deposit appraisal circuit operative in response to a potential condition on said conductors when not shorted to establish an open contact in said shorting path, oscillator tone signaling means energized by said potential condition, and stepping means in said deposit appraisal circuit responsive to said potential condition following operation of said relay means to reset said totalizing means in discrete steps and to coincidently connect the output of said signaling means to said conductors, the number of said discrete steps being proportional to the number of units in the deposit.

5. In a telephone pay station connected to a central office by two conductors, totalizing means operable in response to the deposit of coins for registering the amount of deposit, first contact means controlled by said totalizing means to connect a shorting path across said conductors upon deposit of a first amount and to disconnect said shorting path upon deposit of a second amount which when taken in conjunction with said first amount equals a predetermined minimum amount, second contact means controlled by said totalizing means to connect a deposit appraisal circuit between said conductors upon deposit of said first amount, relay means in said deposit appraisal circuit operative in response to a potential condition on resistance means in said deposit appraisal circuit between said conductors when not shorted to establish said shorting path in an open condition during the remainder of the call, reset means in said deposit appraisal circuit operative in response to a central office-applied direct current talking potential to reset said totalizing means, coin disposal means operative in response to a potential between one of said conductors and ground to collect or refund deposited coins, and a circuit established upon operation of said coin disposal means to connect a path for said refund or collect potential through said reset means.

6. In a telephone pay station connected to a central office by two conductors, totalizing means operable in response to the deposit of coins for registering the amount of deposit, first contact means controlled by said totalizing means to connect a shorting path across said conductors upon deposit of a first amount and to disconnect said shorting path upon deposit of a second amount which taken in conjunction with said first amount equals a predetermined minimum amount, second contact means controlled by said totalizing means to connect a deposit appraisal circuit between said conductors upon deposit of said first amount, relay means in said deposit appraisal circuit operative in response to a potential condition on said conductors when not shorted to establish an open contact in said shorting path, oscillating means energized by said potential condition, stepping means in said deposit appraisal circuit responsive to a potential for resetting said totalizing means in discrete steps and coincidently with said steps for connecting the output of said oscillating means to said conductors, the number of said discrete steps being proportional to the number of units in the deposit, a transmitter and receiver connected across said second contact means, coin disposal means operative in response to a potential applied at said central office between one of said conductors and ground to collect or refund deposited coins, and a circuit established upon operation of said coin disposal means to connect a path for said refund or collect potential through said stepping means.

References Cited in the file of this patent

UNITED STATES PATENTS

| | | |
|---|---|---|
| 2,041,933 | Inglis | May 26, 1936 |
| 2,251,073 | Shann | July 29, 1941 |
| 2,804,502 | Iwema | Aug. 27, 1957 |
| 2,883,463 | Goodale et al. | Apr. 21, 1959 |